T. LALOR.

Assignor, by mesne assignments, to W. F. BEASLEY.

Indicator-Lock.

No. 8,212. Reissued May 7, 1878.

WITNESSES.

Jas. E. Hutchinson

Henry C. Hazard

ASSIGNEE.

Wm. F. Beasley, by

Prindle & Co. his Attys

N. PETERS. PHOTO-LITHOGRAPHER, WASHINGTON, D. C.

UNITED STATES PATENT OFFICE.

WILLIAM F. BEASLEY, OF BALTIMORE, MARYLAND, ASSIGNEE, BY MESNE ASSIGNMENTS, OF THOMAS LALOR.

IMPROVEMENT IN INDICATOR-LOCKS.

Specification forming part of Letters Patent No. 80,637, dated August 4, 1868; Reissue No. 8,212, dated May 7, 1878; application filed April 16, 1878.

DIVISION A.

*To all whom it may concern:*

Be it known that THOMAS LALOR, of Toronto, Canada, did invent certain new and useful Improvements in Indicator-Locks, for which Letters Patent No. 80,637 were issued upon the 4th day of August, 1868, which Letters Patent have been found defective, in that the specification and claim do not cover and embrace all of the original invention, as set forth in the application filed in the Patent Office on the 18th day of June, 1868. Now, therefore, being desirous of reissuing said Letters Patent, herewith surrendered, I have prepared, and do hereby declare that the following is a full, clear, and exact description of the said invention, reference being had to the accompanying drawing, making a part of this specification, in which—

Figure 1:
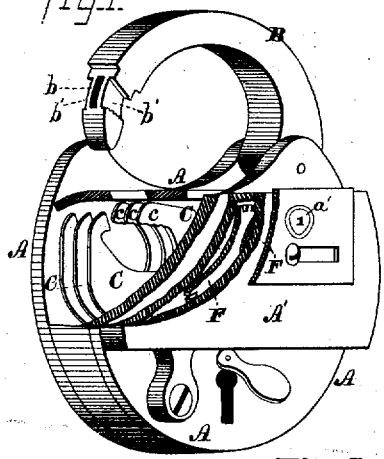
Figure 2:
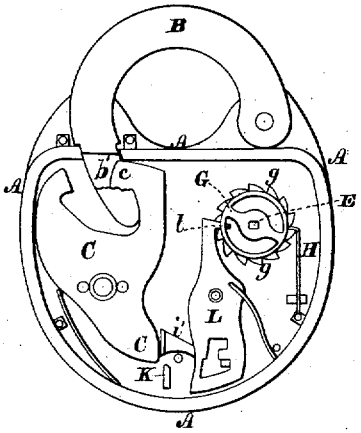
Figure 3:
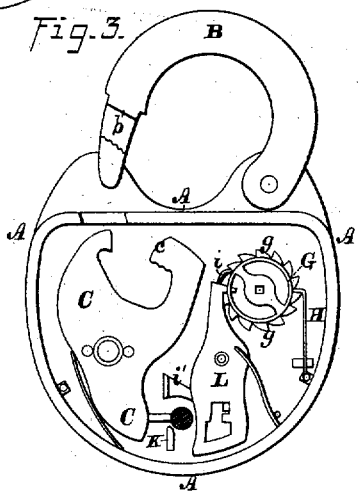
Figure 4:
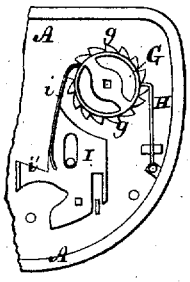
Figure 5:
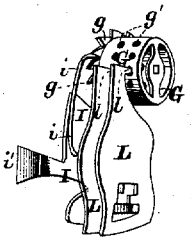

Figure 1 is a perspective view of the front side of the lock. Fig. 2 is a front elevation of the same, the front plate of the casing being removed and the locking mechanism shown in the position occupied when the shackle is locked. Fig. 3 is a like view, and shows the position of said locking mechanism when said shackle is released. Fig. 4 is a front elevation of the toothed cylinder and operating pawls employed for actuating the registering mechanism; and Fig. 5 is a perspective view of said parts.

Letters of like name and kind refer to like parts in each of the figures.

The design of this invention is, mainly, to combine in a practical form a lock and mechanism for indicating each time that said lock is opened; to which end it consists, principally, in the means employed for operating the registering mechanism by the movement of the key within the lock, substantially as and for the purpose hereinafter specified.

It consists, further, in the means employed for locking the registering mechanism in place, substantially as and for the purpose hereinafter shown.

It consists, further, in the peculiar construction of the locking-tumblers and their combination with the shackle, substantially as and for the purpose hereinafter set forth.

It consists, finally, in the means employed for protecting the locking-tumblers, substantially as and for the purpose hereinafter specified.

In the annexed drawing, A represents the casing of the lock, which has the general form usually employed for padlocks, and at its upper end has pivoted the usual curved shackle B. The locking end of the shackle B is slightly reduced in diameter from front to rear, and such reduced portion passes downward through a corresponding opening in the casing A, and is provided with a central opening, *b*, and at each side with a corresponding notch, *b'*, as shown. Pivoted within the casing A, below the locking end of the shackle B, are three tumblers, C, which have the form shown in Fig. 2, and each has such thickness as to enable its upper hooked end *c* to enter one of the notches *b'* or opening *b*.

A spring placed between the outer edge, near the lower end of each tumbler C, and the contiguous side of the casing A, holds the hooked end *c* of said tumbler with a yielding pressure in position to engage with the shackle B, while at its upper end, at the outer edge, said tumbler bears against said casing and limits its movement in such direction.

A key, of usual form, inserted within an opening near the bottom of the casing A, passes over a pivotal stud, and, by rotation, may be caused to bear against the inner edges at the lower end of the tumblers C, and press the same outward, so as to cause the upper hooked ends *c* of said tumblers to be withdrawn from engagement with the shackle B, and permit the latter to be opened.

The engaging end of the shackle B and the upper forward corner of the hooked ends *c* of the tumblers C are beveled, so that said shackle may be closed without use of the key. The engaging-surfaces of the tumblers C and shackle B are toothed, as shown, and prevent the opening of the lock by "malleting."

Within a supplemental casing, A', which is attached to the front wall near the upper end of the casing A, is provided registering mechanism that, by the movement of a shaft, E, causes a number of dials, F, to be rotated in rear of suitable openings *a'* in said casing A', so as to indicate by numerals upon said dials the movement of said shaft. The shaft E carries the units-dial, and is moved one-tenth of a revolution at each movement of the key in unlocking the shackle B by means of the following-described mechanism. Secured upon the rear end of the shaft E, within the casing A, is a cylinder, G, which extends between the front and rear walls of said casing, and at its rear end is provided with ten peripheral teeth, *g*, which are engaged upon the outer side by a spring-detent, H, that prevents rearward motion. Below the cylinder G, upon the rear wall of the casing A, is a plate, I, which has the form shown in Fig. 4, and is arranged to be moved vertically by the revolution of the key. To the upper end of said plate is secured a spring-pawl, *i*, which engages with the teeth *g* of said cylinder, and moves the latter forward a distance equal to one tooth—one-tenth of a revolution—at each upward movement of said plate.

In order that the sliding pawl-plate I may be returned to the lower limit of its motion each time that the shackle B is unlocked, a stop, K, secured to and projecting forward from the rear wall of the casing A, prevents the key from passing beyond the point where the tumblers C are released from engagement with said shackle, and renders necessary the backward movement of said key to its starting-point before it can be withdrawn from the lock.

The cylinder G is locked in place and prevented from moving in either direction by means of two tumblers, L, which have the form shown in Fig. 2, and are pivoted over and engage with the pawl-plate I, in the same manner as do ordinary tumblers with a sliding bolt. At its upper end each tumbler L is provided with a laterally-projecting stud, *l*, which passes into and engages with a corresponding opening, *g'*, in the periphery of the cylinder G. As thus arranged, the tumblers L not only prevent the cylinder G from being rotated, but also operate as a stop to prevent the pawl-plate I from being removed until said tumblers have first been released by the operation of the key of the lock.

In order that the tumblers C may be protected from manipulation through the key-hole, a flange, *i'*, projects from the contiguous end of the plate I forward in front of the lower ends of said tumblers, which flange must be moved upward by the movement of said plate I before the key or any instrument can be pressed against said tumblers.

Having thus fully set forth the nature and merits of this invention, what is claimed as new is—

1. In combination with the shaft E, the cylinder G, provided with peripheral teeth *g* and openings *g'*, the detent H, and the sliding pawl-plate I, having the spring-pawl *i*, and arranged to be moved longitudinally by the key of the lock, substantially as and for the purpose specified.

2. In combination with the cylinder G, provided with the peripheral openings *g'* and with the sliding pawl-plate I, the tumblers L, having the studs *l*, and arranged to be operated by the key of the lock, in the manner and for the purpose substantially as shown.

3. In combination with the shackle B, provided at its locking end with the central opening *b* and notches *b'*, the pivoted tumblers C, having each a hooked end, *c*, and arranged to be thrown into, and released from, engagement with said shackle, substantially as and for the purpose set forth.

4. In combination with the locking-tumblers C, the slide plate I, provided with a flange, *i'*, which, when said tumblers are engaged with the shackles B, is interposed between said tumblers and the key-hole of the lock, and is only removable from such position by means of the key of said lock, substantially as and for the purpose shown and described.

In testimony whereof I have hereto set my hand this 30th day of March, 1878.

WILLIAM F. BEASLEY.

Witnesses:

GEO. S. PRINDLE,

HENRY C. HAZARD.